INVENTOR
PATRICK J. AMODEO
BY
ATTORNEY

United States Patent Office 3,120,670
Patented Feb. 11, 1964

3,120,670
TOOTHBRUSH
Patrick J. Amodeo, Albany, N.Y., assignor to Johnson & Johnson, a corporation of New Jersey
Filed June 13, 1960, Ser. No. 35,761
15 Claims. (Cl. 15—167)

This invention relates to toothbrushes and more particularly to toothbrushes containing a discernible odoriferous material.

It is recognized that instructing and disciplining children in proper oral hygiene habits presents some difficulties. Various devices and artifices have been employed by parents, and toothbrush manufacturers, to overcome these difficulties. To stimulate children into using toothbrushes, they have been made in different colors and styles and with handles in the form of novelty designs, such as animals, clowns and the like. While not limited thereto, the toothbrush of this invention is particularly useful in inducing children to use toothbrushes regularly and frequently.

Most children, and adults, enjoy eating comestibles such as candy, soda and ice cream because of their sweetness and thir flavor. Often, to induce a child to perform an act considered objectionable by him, such as the brushing of teeth, candy or the like may be offered as an inducement.

In accordance with this invention, toothbrushes are made more appealing to children, and adults, to stimulate their use and to make their use more enjoyable by incorporating into the toothbrush an odoriferous material having an odor suggestive of a comestible. In another form of the invention, the toothbrush is of a color which is suggestive of a comestible and also contains an odor suggestive of the comestible which is suggested by the color of the brush. By way of example, the toothbrush may have an orange color, e.g., the handle portion may be colored orange, or orange and white. Since the color orange is suggestive of the fruit orange, the odoriferous material incorporated into the toothbrush will have the odor of an orange.

Numerous different types of odoriferous materials may be incorporated into the toothbrush of this invention. They preferably have an odor suggestive of such foods as candy, lollipops, ice creams, sodas, cakes, cookies, fruits and similar comestibles which have a pleasing fragrance and which are also sweet tasting. Examples of such odors include strawberry, cherry, orange, lemon, lime, raspberry, pineapple, apple, peach, banana, apricot, grape, vanilla, chocolate, peppermint, licorice, root beer, etc. These odors are appealing and pleasing to children and adults alike.

Figure 1:
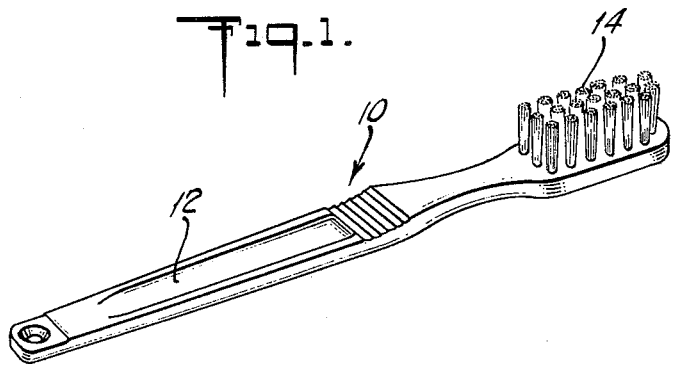
FIG. 1 is a perspective view of a toothbrush incorporating the invention.
Figure 2:
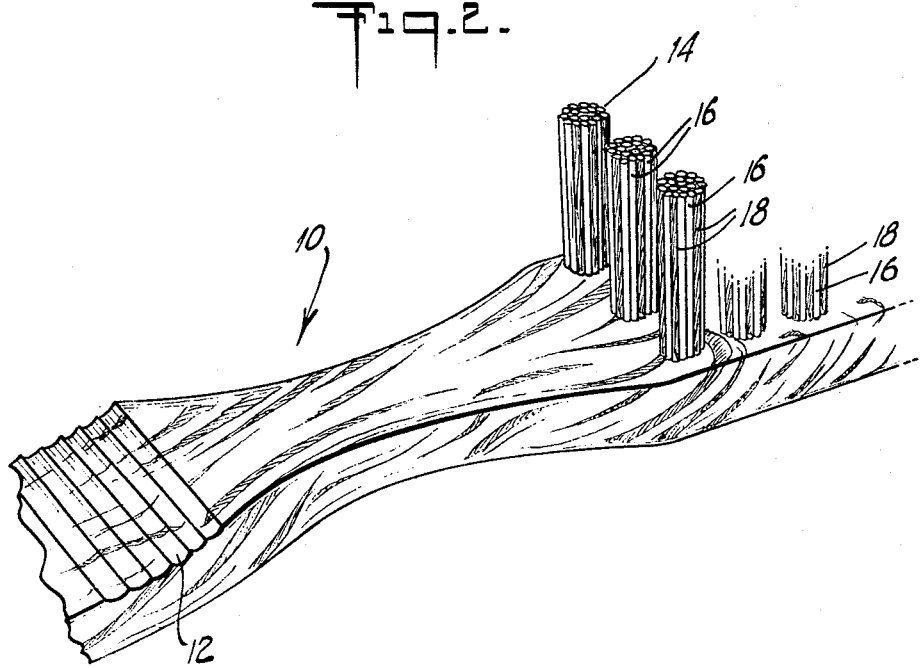
FIG. 2 is a fragmentary view on an enlarged scale, of the bristle portion of the brush with bristles of intermixed colors.

Referring to the drawings, the toothbrush 10 comprises a handle portion 12 and a bristle portion 14. The handle portion, which may be of any desired shape, form or configuration, has tufts secured thereto in any conventional manner.

The odoriferous material is preferably incorporated into the handle portion of the toothbrush. It may be incorporated during any suitable stage of the manufacturing operation. Most tootbrushes currently available have handles made from a synthetic plastic, such as cellulose acetate, cellulose butyrate, nylon, and the like. The plastic is usually obtained in the form of granules which are dried prior to forming the toothbrushes by conventional molding techniques, such as by injection molding.

The odoriferous material may be incorporated into the granules in a tumbling drum prior to drying and be deposited on the granules. In this manner the odoriferous material will also be present in the interior of the brush handle.

The odoriferous material may be in the form of a solid or liquid, or of any other suitable form; the amounts added will depend upon the concentration of the essences and the strength of odor desired. Ordinarily, small quantities, e.g., one to three percent by weight, of commercial essences are satisfactory. The material used is desirably of the type which will be retained in the toothbrush for the shelf life of the toothbrush. The toothbrush may also have the odoriferous material incorporated therein by dipping the brush, e.g., the handle portion of the brush, into a solution containing the odoriferous material so that the odoriferious material is primarily on the external surfaces of the brush.

The handling and processing of the materials used in making the toothbrushes, and the methods employed in manufacturing, including the time and temperatures of drying and of injection molding, should be controlled so that the odoriferious material will not be driven off.

As noted above, the toothbrush preferably has a color which is suggestive of a comestible and also contains an odoriferous material having an odor suggestive of the flavor of the comestible which is suggested by the color in the handle. The color of the handle portion of the brush may be solid or it may be marbleized or variegated, or arranged in any other fashion. The bristle portion 14 of the brush may also contain bristles of a mixture of different colors, although solid colors are acceptable. By way of example, a portion of the bristles 16 may be white and the remainder 18 of the same color which is incorporated in the handle. This provides a brush with a particularly attractive bristle portion, especially appealing to children.

Examples of colors which are suggestive of comestibles include white, which is suggestive of vanilla; brown, which is suggestive of chocolate; red, suggestive of an apple; pink, suggestive of strawberry, raspberry, or cherry; green, suggestive of lime; black, suggestive of licorice, and the like.

The following examples of formulations from which toothbrushes incorporating the invention may be prepared are given by way of illustration. The Tenite acetate, a synthetic thermoplastic material composed primarily of cellulose acetate, referred to in the examples is presently available from Eastman Chemical Products, Inc. The compound oils and odors are presently available from Fritzsche Brothers of New York, New York.

(1) For a marbelized red and white brush handle incorporating a strawberry odor:
  85 lb. Tenite Acetate White 50413, 036A–MH.
  15 lb. Tenite Acetate Red 51079, 036A–H2.
  1 lb. Strawberry Compound Oil 18296.

(2) For a marbelized orange and white brush handle incorporating an orange odor:
  85 lb. Tenite Acetate White 50413, 036A–MH.
  15 lb. Tenite Acetate Orange 51250, 036A–H2.
  3 lb. Orange Compound Oil 20196.

(3) For a marbelized yellow and white brush handle incorporating a lemon odor:
  85 lb. Tenite Acetate White 50413, 036A–MH.
  15 lb. Tenite Acetate Yellow 51249, 036A–H2.
  3 lb. Lemon Compound Oil 18294.

(4) For a marbelized green and white brush handle incorporating a lime odor:
  85 lb. Tenite Acetate White 50413, 036A–MH.
  15 lb. Tenite Acetate Green 51248, 036A–H2.
  3 lb. Lime Compound Oil 18300.

(5) For a marbelized brown and white brush handle incorporating a chocolate odor:
   85 lb. Tenite Acetate White 50413, 036A–MH.
   15 lb. Tenite Acetate Brown 51251, 036A–H2.
   1 lb. Chocolate Compound Oil 30037.
(6) For a white brush handle incorporating a vanilla odor:
   100 lb. Tenite Acetate White 50413, 036A–MH.
   2 lb. Liquid Vanilla Odorant 31858.

As noted above, the acetate plastics may be placed into a mixing drum, preferably of metal or other non-absorbent material, at room temperature, and the odoriferous material added. The plastic and the odoriferous material are then mixed by tumbling the drum for a sufficient period of time, e.g., 10 minutes, to uniformly distribute the odoriferous material throughout the plastic. If desired, a small quantity of lubricant, such as zinc stearate, may be added.

After mixing, the mixture may be placed in trays in a hot air oven to remove the moisture from the plastic material prior to molding it into brushes by injection molding processes. The temperature of the hot air oven is maintained sufficiently low to prevent the odoriferous material from being driven off. Drying the above materials in a non-circulating type oven at a temperature of about 160° F. for a period of about 4 hours has been found to be suitable, depending upon the amount of moisture present. Directly after drying, the material may be placed in sealed containers or be directly molded into toothbrushes by injection molding.

Synthetic plastic materials, such as the cellulosic plastic materials referred to above in connection with the illustrative examples, customarily contain a plasticizer. The Eastman Chemical Products, Inc., Tenite Acetates referred to above contain such a plasticizer. It is believed that, upon standing, such plasticizers tend to migrate to the surface of plastic and, in connection with a toothbrush, tend to migrate to the surface of the handle portion of the brush.

It is further believed that in so migrating the plasticizer tends to carry with it the odoriferous material incorporated in the handle. In this event, it is probable that the odor of the odoriferous material may therefore be discernible in the brush over a prolonged period of time. Accordingly, it may be desirable to incorporate a plasticizer in the synthetic plastic from which the brush is made.

The toothbrush may be packaged within a container made from an extruded plastic tube provided with a fixed base and a removable cap. The container or the removable cap may also have incorporated therein the odor incorporated in the toothbrush for ready identification of the order in the brush packaged within the container. Alternatively, a drop of the odoriferous material may be placed into the toothbrush container, the toothbrush placed therein, and the container then capped. The brush, and the container, will then pick up the odor of the odoriferous material and the odoriferous material then becomes incorporated therein.

It is apparent that changes may be made from the foregoing description while still remaining within the invention.

This application is a continuation-in-part of my co-pending application Serial No. 14,881, "Brush," filed March 14, 1960, now abandoned.

What is claimed is:

1. A toothbrush being made of synthetic plastic material and having a color suggestive of the flavor of a comestible, said toothbrush being made of synthetic plastic material and having initially incorporated therein and integrally associated therewith a discernible odoriferous material, said odoriferous material having an odor suggestive of the flavor of the comestible suggested by said color.

2. A toothbrush according to claim 1 wherein the color of said toothbrush is marbleized.

3. A toothbrush according to claim 1 wherein the bristle portion contains a mixture of bristles of different colors.

4. A toothbrush comprising a handle portion of synthetic plastic material and a bristle portion, said toothbrush having a color suggestive of the flavor of a comestible, said toothbrush having initially incorporated in the handle portion and integrally associated therewith a discernible odoriferous material, said odoriferous material having an odor suggestive of the flavor of the comestible suggested by said color.

5. A toothbrush comprising a handle portion of synthetic plastic material and a bristle portion, said toothbrush having a color suggestive of the flavor of a comestible in said handle portion, said toothbrush having initially incorporated therein and integrally associated therewith a discernible odoriferous material, said odoriferous material having an odor suggestive of the flavor of the comestible suggested by said color, the color in said handle portion being variegated.

6. A toothbrush comprising a handle portion of synthetic plastic material and a bristle portion, said toothbrush having a color suggestive of the flavor of a comestible, said toothbrush having initially incorporated therein and integrally associated therewith a discernible odoriferous material, said odoriferous material having an odor suggestive of the flavor of the comestible suggested by said color, the bristle portion of said toothbrush containing bristles like the color in said handle.

7. A toothbrush comprising a handle portion of synthetic plastic material and a bristle portion, said toothbrush having a yellow color, said toothbrush having initially incorporated therein and integrally associated therewith a discernible odoriferous material having an odor suggestive of a lemon.

8. A toothbrush comprising a handle portion of synthetic plastic material and a bristle portion, said toothbrush having an orange color, said toothbrush having initially incorporated therein and integrally associated therewith a discernible odoriferous material having an odor suggestive of an orange.

9. A toothbrush comprising a handle portion of synthetic plastic material and a bristle portion, said toothbrush having a brown color, said toothbrush having initially incorporated therein and integrally associated therewith a discernible odoriferous material having an odor suggestive of chocolate.

10. A toothbrush comprising a handle portion of synthetic plastic material and a bristle portion, said toothbrush having a white color, said toothbrush having initially incorporated therein and integrally associated therewith a discernible odoriferous material having an odor suggestive of vanilla.

11. A toothbrush comprising a handle portion of synthetic plastic material and a bristle portion, said toothbrush having a red color, said toothbrush having initially incorporated therein and integrally associated therewith a discernible odoriferous material having an odor suggestive of the flavor of a member selected from the class consisting of strawberry, raspberry, or cherry.

12. A toothbrush in accordance with claim 1 wherein the odoriferous material has an odor suggestive of a fruit.

13. A toothbrush in accordance with claim 1 wherein the odoriferous material has an odor suggestive of a sweet-tasting comestible.

14. A toothbrush in accordance with claim 4 wherein said handle portion is formed of a synthetic plastic material containing a plasticizer.

15. A toothbrush in accordance with claim 4 wherein said handle portion is formed of a synthetic plastic material containing a plasticizer which migrates to the surface of said handle portion carrying with it said odoriferous material.

References Cited in the file of this patent

UNITED STATES PATENTS

| | | |
|---|---|---|
| Re. 21,197 | Hill et al. | Sept. 5, 1939 |
| 174,619 | Clark | May 14, 1876 |
| 540,884 | Stout et al. | June 11, 1895 |
| 792,471 | Smith | June 13, 1905 |
| 802,711 | Schrader | Oct. 24, 1905 |
| 1,219,147 | Picard | Mar. 13, 1917 |
| 1,575,317 | Carmichael | Mar. 2, 1926 |
| 2,008,206 | Grant | July 16, 1935 |
| 2,046,336 | Maywald et al. | July 7, 1936 |
| 2,289,313 | Cave | July 7, 1942 |
| 2,610,851 | Jones | Sept. 16, 1952 |
| 2,649,959 | Hallahan | Aug. 25, 1953 |
| 2,665,442 | Martino | Jan. 12, 1954 |
| 2,826,201 | Yoder | Mar. 11, 1958 |
| 2,829,086 | Kirschenbauer | Apr. 1, 1958 |
| 2,913,373 | Weisz et al. | Nov. 17, 1959 |

FOREIGN PATENTS

| | | |
|---|---|---|
| 496,288 | Great Britain | Nov. 21, 1938 |
| 546,136 | Great Britain | June 30, 1942 |
| 599,237 | Great Britain | Mar. 8, 1948 |

UNITED STATES PATENT OFFICE
CERTIFICATE OF CORRECTION

Patent No. 3,120,670                                February 11, 1964

Patrick J. Amodeo

It is hereby certified that error appears in the above numbered patent requiring correction and that the said Letters Patent should read as corrected below.

Column 1, line 23, for "thir" read -- their --; column 3, line 54, for "order" read -- odor --; lines 67 and 68, strike out "being made of synthetic plastic material and".

Signed and sealed this 28th day of July 1964.

(SEAL)

Attest:

ESTON G. JOHNSON                                    EDWARD J. BRENNER
Attesting Officer                                            Commissioner of Patents